US010753036B2

(12) United States Patent
Yagi et al.

(10) Patent No.: US 10,753,036 B2
(45) Date of Patent: *Aug. 25, 2020

(54) OVERCOAT AND IMAGE FORMING METHOD

(71) Applicant: BROTHER KOGYO KABUSHIKI KAISHA, Nagoya-shi, Aichi (JP)

(72) Inventors: Ryohei Yagi, Nagoya (JP); Goro Okada, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/717,499

(22) Filed: Sep. 27, 2017

(65) Prior Publication Data

US 2018/0094380 A1 Apr. 5, 2018

(30) Foreign Application Priority Data

Sep. 30, 2016 (JP) ................................ 2016-194926

(51) Int. Cl.
*B41J 11/00* (2006.01)
*B41J 3/407* (2006.01)
(Continued)

(52) U.S. Cl.
CPC .......... *D06M 13/322* (2013.01); *B41J 11/002* (2013.01); *D06M 15/263* (2013.01);
(Continued)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 11/0015; B41J 11/002; B41J 2/161; B41J 2/1623; B41J 2202/00; B41J 2202/03; B41J 2/14201; B41J 2/045; C09D 11/36; C09D 11/40; C09D 11/30; C09D 11/38; C09D 11/32; C09D 11/322;
(Continued)

(56) References Cited

U.S. PATENT DOCUMENTS

2004/0182273 A1 9/2004 Sawada et al.
2005/0272333 A1* 12/2005 Wang .................... D06M 11/79 11/79

(Continued)

FOREIGN PATENT DOCUMENTS

JP 2000-309091 A 11/2000
JP 2004-285177 A 10/2004

(Continued)

OTHER PUBLICATIONS

Office Action issued in the related Japanese patent application (No. 2016-194927) dated Dec. 27, 2018.

(Continued)

*Primary Examiner* — Manish S Shah
(74) *Attorney, Agent, or Firm* — K&L Gates LLP

(57) ABSTRACT

An overcoat to be applied to an ink printed on fabric or fabric to be printed with an ink, includes: a carbodiimide group-containing compound.

15 Claims, 6 Drawing Sheets

(51) Int. Cl.

| | |
|---|---|
| ***D06M 13/322*** | (2006.01) |
| ***D06M 15/263*** | (2006.01) |
| ***D06P 1/649*** | (2006.01) |
| ***D06P 5/06*** | (2006.01) |
| *D06P 5/30* | (2006.01) |
| *D06P 5/08* | (2006.01) |

(52) U.S. Cl.
CPC .............. *D06P 1/6493* (2013.01); *D06P 5/06* (2013.01); *B41J 3/4078* (2013.01); *D06P 5/08* (2013.01); *D06P 5/30* (2013.01)

(58) Field of Classification Search
CPC ... C09D 11/324; C09D 11/328; C09D 11/101; C09D 11/102; C09D 11/005; C09D 11/54; C09D 11/52; B41M 5/0011; B41M 5/0017; B41M 5/0047; B41M 7/00; B41M 7/0072; B41M 5/52; B41M 5/5218
See application file for complete search history.

(56) References Cited

U.S. PATENT DOCUMENTS

| | | | | |
|---|---|---|---|---|
| 2009/0226678 | A1* | 9/2009 | Yatake ................. | C08G 18/625 428/195.1 |
| 2009/0226679 | A1 | 9/2009 | Yatake et al. | |
| 2014/0011928 | A1* | 1/2014 | Iwasawa .............. | C09D 133/10 524/249 |
| 2014/0139595 | A1 | 5/2014 | Hong et al. | |
| 2015/0054885 | A1 | 2/2015 | Sugiyama | |

FOREIGN PATENT DOCUMENTS

| | | | |
|---|---|---|---|
| JP | 2004-291461 | A | 10/2004 |
| JP | 2010-155441 | A | 7/2010 |
| JP | 2010156089 | A | 7/2010 |
| JP | 2013-095766 | A | 5/2013 |
| JP | 2013-151600 | A | 8/2013 |
| JP | 2015040347 | A | 3/2015 |
| JP | 2016-505651 | A | 2/2016 |
| JP | 2016-069530 | A | 5/2016 |
| WO | 2008/018406 | A1 | 2/2008 |

OTHER PUBLICATIONS

Office Action issued in corresponding JP Application No. 2016-194926, dated Nov. 21, 2018.

U.S. Appl. No. 15/717,546, filed Sep. 27, 2017 titled "Overcoat and Image Forming Method".

* cited by examiner

OVERCOAT AND IMAGE FORMING METHOD

CROSS-REFERENCE TO RELATED APPLICATION

This application claims priority from Japanese Patent Application No. 2016-194926 filed on Sep. 30, 2016. The entire subject matter of the Japanese Patent Application is incorporated herein by reference.

BACKGROUND

A method for printing an image by ejecting an ink to fabric such as clothes is widely known. The method includes a heat-fixing step of fixing the ink applied on the fabric in a printing step by heating.

SUMMARY

An overcoat to be applied to an ink printed on fabric or fabric to be printed with an ink, includes: a carbodiimide group-containing compound.

DETAILED DESCRIPTION

Figure 1A:
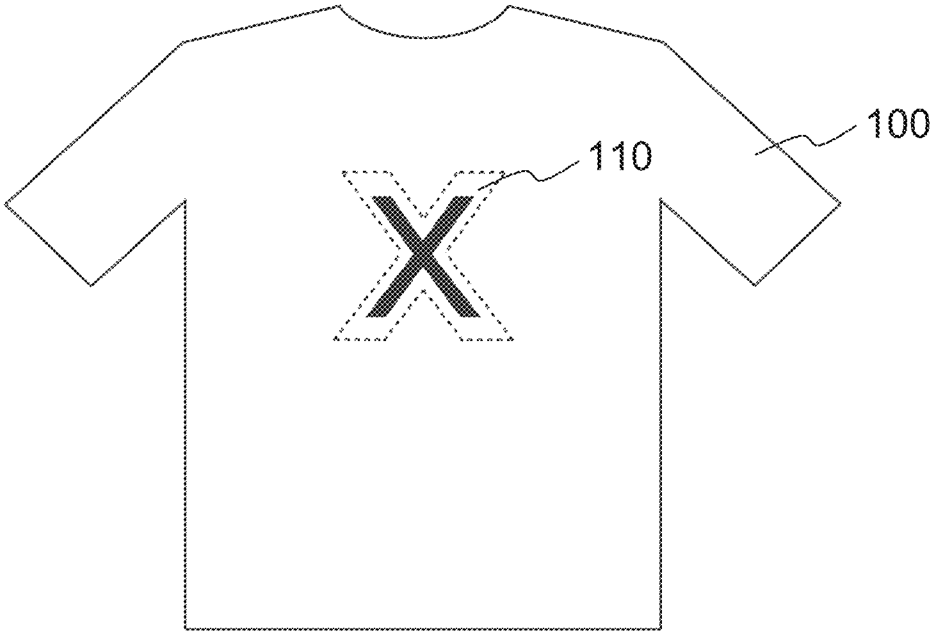
FIGS. 1A and 1B are illustrations showing example applications of a treatment agent in a method for forming an image.

An overcoat to be applied to an ink printed on fabric or fabric to be printed with an ink, includes: a carbodiimide group-containing compound. The overcoat is characterized in that it includes the carbodiimide group-containing compound, and other configurations are by no means limited. The overcoat may contain a coloring agent such as a pigment or a dye, for example, however preferably does not contain a coloring agent. The overcoat is not an ink, for example, and preferably does not contain a coloring agent. When the overcoat contains a coloring agent, the amount of the coloring agent is an amount with which the overcoat does not virtually serve as an ink for printing to fabric.

The carbodiimide group-containing compound is a compound having a carbodiimide group (—N═C═N—) in a molecule. The carbodiimide group-containing compound can be, for example, polycarbodiimide. Furthermore, examples of the carbodiimide group-containing compound include cyclic carbodiimide, isocyanato terminal carbodiimide, dicyclohexyl carbodiimide, diisopropyl carbodiimide, amino group-containing carbodiimide, 1-ethyl-3-(3-dimethyl aminopropyl) carbodiimide hydrochloride, N-t-butyl-N-ethyl carbodiimide, and di-t-butyl carbodiimide.

The carbodiimide group-containing compound can be, for example, a compound that is soluble in water, a compound which forms emulsion in water, a compound which forms dispersion in water, and the like. Any one of these compounds may be used alone or two or more of them may be used in combination. From the viewpoint of suppressing the yellowing of the overcoat-applied area, a water-soluble carbodiimide group-containing compound is preferably used.

As the carbodiimide group-containing compound, for example, a commercially available product may be used. Examples of the commercially available product include: "CARBODILITE®V-02", "CARBODILITE®V-02-L2", "CARBODILITE®SV-02", "CARBODILITE®V-04", "CARBODILITE®V-10", and "CARBODILITE®SW-12G", each of which is an aqueous solution containing 40 wt % carbodiimide group-containing compound; "CARBODILITE®E-02" and "CARBODILITE®E-03A", each of which is a water emulsion containing 40 wt % carbodiimide group-containing compound; and "CARBODILITE®E-05", which is a water dispersion containing 40 wt % carbodiimide group-containing compound. All of the aforementioned products are products of Nisshinbo Chemical Inc.

The lower limit of the content of the carbodiimide group-containing compound (C) in the total amount of the overcoat is, for example, 0.1 wt % or more or 0.25 wt % or more. When the content (C) is 0.25 wt % or more, an ink film strength after washing can further be improved. The upper limit of the content (C) is, for example, 0.75 wt % or less or 5 wt % or less. When the water-soluble carbodiimide group-containing compound is used as the carbodiimide group-containing compound, the content thereof in the total amount of the overcoat is, for example, 0.75 wt % or less from the viewpoint of suppressing the yellowing of the overcoat-applied area, and is, for example, more than 0.25 wt % from the viewpoint of improving the ink film strength.

The overcoat may further contain a resin other than the carbodiimide group-containing compound. Examples of the resin include an acrylic resin, a styrene-acrylic resin, a polyester resin, and an urethan resin. Among them, the overcoat preferably contains at least one of an acrylic resin and a styrene-acrylic resin, whereby the generation of aggregation in storage of the overcoat is suppressed and superior storage stability is achieved.

As the resin, for example, a commercially available product may be used. Examples of the commercially available product include "Mowinyl®-Powder730L" and "Mowinyl®-Powder6960", each of which is an acrylic resin produced by Nippon Synthetic Chemical Industry Co., Ltd.; "Mowinyl®-Powder966A" which is a styrene-acrylic resin produced by Nippon Synthetic Chemical Industry Co., Ltd.; "Vylonal MD-1480" and "Vylonal MD-2000", each of which is a polyester resin produced by TOYOBO CO., LTD.; "UCOAT®UX-320", "PERMARIN®UA-150", "PERMARIN®UA-310", and "PERMARIN®UA-200", each of which is an urethan resin produced by Sanyo Chemical Industries, Ltd.; "BONTIGHTER®HUX-380", "BONTIGHTER®HUX-386", "BONTIGHTER®HUX-561S", "BONTIGHTER®HUX-564", "BONTIGHTER®HUX-210", and "BONTIGHTER®HUX-282", each of which is an urethan resin produced by ADEKA CORPO- RATION; and "SUPERFLEX®460", "SUPERFLEX®300", and "SUPERFLEX®E-4800", each of which is an urethan resin produced by DKS Co., Ltd.

The content of the resin (R) in the total amount of the overcoat is, for example, 1 wt % to 22 wt % or 2 wt % to 5 wt %. From the viewpoint of improving the storage stability, the content of the carbodiimide group-containing compound (C) and the content of the resin (R) in the total amount of the overcoat preferably satisfy C/R≤0.375.

The overcoat may further contain a surfactant. Examples of the surfactant include a polyether-modified siloxane surfactant, a polyether-modified polydimethylsiloxane surfactant, and a hydroxyl group-containing polyether-modified polydimethylsiloxane surfactant. Among them, the overcoat preferably contains a polyether-modified siloxane surfactant, whereby the overcoat marks in the overcoat-applied area can be reduced. It is presumed that, since the polyether-modified siloxane surfactant has lower surface tension than other surfactants in the form of an aqueous solution having the same concentration and is superior in wettability to fabric, the overcoat marks can be reduced. The present invention, however, is not limited to this presumption.

As the surfactant, for example, a commercially available product may be used. Examples of the commercially available product include "BYK®-349", "BYK®-345", "BYK®-347", "BYK®-348", and "UV3530", each of which is a polyether-modified siloxane surfactant produced by BYK Additives & Instruments; "BYK®-307" which is a polyether-modified polydimethylsiloxane surfactant produced by BYK Additives & Instruments; and "BYK®-377" which is a hydroxyl group-containing polyether-modified polydimethylsiloxane surfactant produced by BYK Additives & Instruments.

The content of the surfactant in the total amount of the overcoat is, for example, 0.1 wt % to 1 wt % or 0.3 wt %.

The overcoat may further contain glycerin which improves the fixability and the washing fastness of the ink. It is presumed that this effect can be achieved by the following mechanism. That is, glycerin slows the evaporation speed of water in the overcoat in heat-fixing, whereby the alignment of the resins in the ink described below is improved. The present invention, however, is not limited to this presumption. The content of glycerin in the total amount of the overcoat is, for example, 30 wt % to 60 wt % or 30 wt % to 50 wt %. When the overcoat contains glycerin in the range from 30 wt % to 50 wt %, the storage stability can further be improved.

The overcoat may further contain water. The water can be, for example, distilled water, ion-exchange water, or pure water. The content of the water in the total amount of the overcoat may be, for example, the balance of other components.

The overcoat may further contain, additives such as a water-soluble organic solvent other than the glycerin, a pH adjuster, a viscosity modifier, a surface tension modifier, and a mildewproofing agent as necessary. Examples of the water-soluble organic solvent include polyalcohol, polyalcohol derivatives, alcohol, amide, ketone, ketoalcohol, ether, nitrogen-containing solvents, sulfur-containing solvents, propylene carbonate, ethylene carbonate, and 1,3-dimethyl-2-imidazolidinone. Examples of the polyalcohol include ethylene glycol, diethylene glycol, propylene glycol, butylene glycol, hexylene glycol, triethylene glycol, polyethylene glycol, dipropylene glycol, tripropylene glycol, polypropylene glycol, trimethylolpropane, 1,5-pentanediol, and 1,2,6-hexanetriol. Examples of the polyalcohol derivative include ethylene glycol methyl ether, ethylene glycol ethyl ether, ethylene glycol-n-propyl ether, ethylene glycol-n-butyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, and tripropylene glycol-n-butyl ether. Examples of the alcohol include methyl alcohol, ethyl alcohol, n-propyl alcohol, isopropyl alcohol, n-butyl alcohol, sec-butyl alcohol, isobutyl alcohol, tert-butyl alcohol, and benzyl alcohol. Examples of the amide include dimethylformamide and dimethylacetamide. The ketone can be, for example, acetone or the like. The ketoalcohol can be, for example, diacetone alcohol or the like. Examples of the ether include tetrahydrofuran and dioxane. Examples of the nitrogen-containing solvent include pyrrolidone, 2-pyrrolidone, N-methyl-2-pyrrolidone, cyclohexylpyrrolidone, and triethanolamine. Examples of the sulfur-containing solvent include thiodiethanol, thiodiglycol, thiodiglycerol, sulfolane, and dimethylsulfoxide. Examples of the viscosity modifier include polyvinyl alcohol, cellulose, and water-soluble resin.

The overcoat may be prepared by uniformly mixing the carbodiimide group-containing compound and an additive component(s) as necessary by a conventionally known method, for example. The overcoat may be prepared by removing an insoluble matter(s) with a filter or the like after mixing, for example.

In the overcoat, for example, the b* value of the overcoat-applied area applied on the ink printed on the fabric or the fabric to be printed with the ink is preferably 4.22 or less.

A method for forming an image on fabric, includes the following steps: printing an image on fabric with an ink; applying an overcoat to the ink printed on the fabric or the fabric to be printed with the ink; and thermally fixing the ink on the fabric by using a heating unit configured to heat a printed area of the fabric, wherein the overcoat includes a carbodiimide group-containing compound. Besides the image printing step, the overcoating step, and the heat-fixing step, the image forming method may further include the treatment step, the heat treatment step, and the compression step described below, for example.

The image forming method may include a treatment step of applying a treatment agent to the fabric. The treatment step is performed prior to the image printing step, for example. The treatment agent for use in the treatment step contains a cationic substance that reacts with a coloring agent contained in the ink to aggregate, for example. The treatment agent is characterized in that it contains a cationic substance, and other configurations are by no means limited. For example, the treatment agent may contain water or may contain a component other than a cationic substance and water. The cationic substance contained in the treatment agent is not limited to particular cationic substances, and examples thereof include polyvalent metal ions such as a calcium ion, a magnesium ion, an aluminum ion, a barium ion, a copper ion, an iron ion, a manganese ion, a nickel ion, a tin ion, a titanium ion, and a zinc ion; cationic polymers; and cationic surfactants. The polyvalent metal ion may be added to the treatment agent in a form of salt with a chloride ion, a bromide ion, an iodide ion, a sulfate ion, a nitrite ion, a nitrate ion, a dihydrogenphosphate ion, an acetate ion, a thiocyanate ion, an oxalate ion, a lactate ion, a fumarate ion, a citrate ion, a salicylate ion, a benzoate ion, and the like. That is, the polyvalent metal ion may be added to the treatment agent in a form of calcium chloride, calcium bromide, calcium iodide, calcium nitrite, calcium nitrate, calcium dihydrogenphosphate, calcium thiocyanate, calcium lactate, calcium fumarate, calcium citrate, magnesium chloride, magnesium bromide, magnesium iodide, magnesium sulfate, aluminium chloride, aluminium bromide, aluminium sulfate, aluminium nitrate, aluminium acetate, barium chloride, barium bromide, barium iodide, barium nitrate, barium thiocyanate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, tin sulfate, titanium chloride, zinc chloride, zinc bromide, zinc sulfate, zinc thiocyanate, zinc acetate, and the like.

In the treatment step, the treatment agent may be applied, for example, by an ink-jet method, a spraying method, a stamping method, a brushing method, or a method using a roller.

Figure 1B:
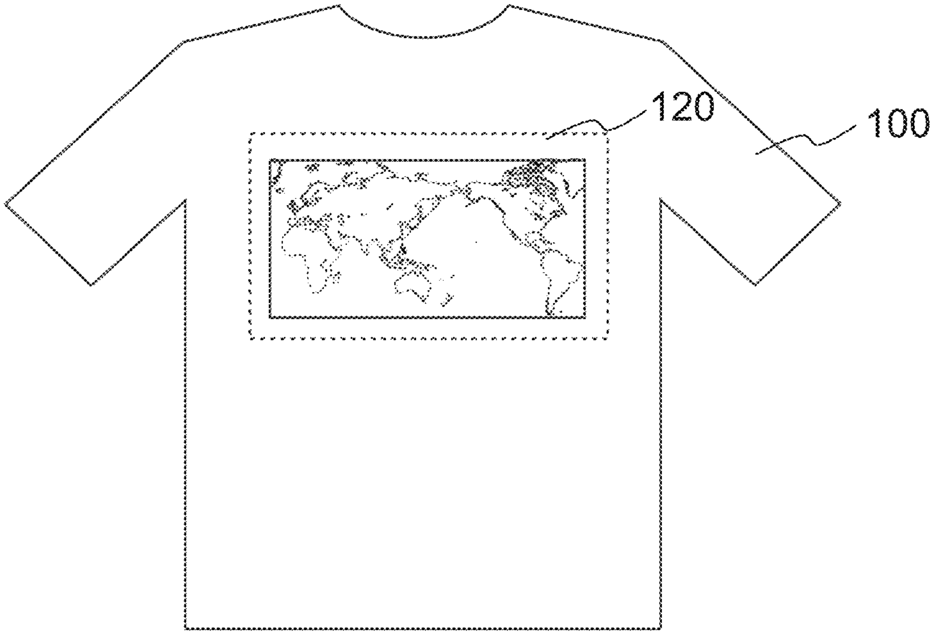

In the treatment step, the treatment agent is applied to at least an area having substantially the same size as an area to be printed with an ink, and is preferably applied to an area larger than the area to be printed. For example, as shown in FIG. 1A, when the letter "X" is printed on fabric (T-shirt in this example) 100, the treatment agent is preferably applied to form a treatment agent-applied area 110 having a line width wider than that of the letter. Furthermore, as shown in FIG. 1B, when an image is printed on the fabric (T-shirt) 100, the treatment agent is preferably applied to form a treatment agent-applied area 120 that is larger than the image.

The image forming method may include, after the treatment step, at least one of a heat treatment step of applying heat treatment to the treatment agent-applied area and a compression step of compressing the treatment agent-applied area. The heat treatment may be applied by using a commercially available hot pressing machine, oven, belt conveyor oven, or the like, for example. The temperature of the heat treatment is not limited to particular values, and is, for example, from 160° C. to 185° C. The compression may be performed by using a commercially available hot pressing machine under the same condition as the heat treatment, for example.

Subsequently, the image printing step of printing an image on the fabric with an ink is performed. The ink for use in the image printing step contains, for example, a coloring agent and a resin having a functional group (for example, carboxyl group, amino group, hydroxyl group, epoxy group, or the like) that reacts with a carbodiimide group to form a crosslinking structure. The other configurations of the ink are by no means limited. For example, the ink may contain water or may contain a component other than a coloring agent, the resin, and water. As the ink, for example, a pigment ink, a dye ink, or the like may be used, and the pigment ink is preferable. The ink may include inks of five colors, namely white, yellow, magenta, cyan, and black, for example. For example, in the case where the white ink is used on the fabric having a dark background color, a hole(s) or a crack(s) of the ink film and yellowing caused in the heat-fixing step are particularly conspicuous as the contrast between the white ink and the background color of the fabric is larger than the contrast between the color ink and the background color of the fabric. In the image forming method, this can be prevented by applying the overcoat to the ink printed on the fabric or the fabric to be printed with the ink as described below.

The image printing step may include a base forming step of forming a base on the fabric with a first ink and an image forming step of forming an image on the base with a second ink. The first ink may be a white ink and the second ink may be a color ink. In this manner, a color image having a high color developing property can be formed on the fabric having a dark background color.

The white ink may contain a white pigment containing a hollow particle or a non-hollow particle (a particle which is not hollow. It is also called a solid particle) as a coloring agent, for example. In the white ink, the hollow particle and the non-hollow particle are used in combination as the white pigment, for example.

Examples of the hollow particle include "SX-866(B)" (styrene-acrylic dispersion liquid, pigment solid content: 20 wt %, primary particle size: 0.3 μm) and "SX-868(B)" (styrene-acrylic dispersion liquid, pigment solid content: 20 wt %, primary particle size: 0.5 μm), produced by JSR CORPORATION; "ROPAQUE® ULTRA E" (styrene-acrylic dispersion liquid, pigment solid content: 30 wt %, primary particle size: 0.4 μm) produced by Rohm and Haas Electronic Materials K.K.; and "NIPOL® V1004" (modified styrene-butadiene dispersion liquid, pigment solid content: 50 wt %, primary particle size: 0.3 μm), "NIPOL® MH8055" (styrene-acrylic dispersion liquid, pigment solid content: 30 wt %, primary particle size: 0.8 μm), and "NIPOL® MH5055" (styrene-acrylic dispersion liquid, pigment solid content: 30 wt %, primary particle size: 0.5 μm), produced by ZEON CORPORATION. It is to be noted that the primary particle size indicates a volume average particle size.

Examples of the non-hollow particle include white pigments having high shielding property such as titanium oxide, silicon oxide, zinc oxide, aluminum oxide, magnesium oxide, barium sulfate, and calcium carbonate.

The white ink may further contain a polymer dispersant obtained by neutralizing an anionic water-soluble resin with a basic compound, for example. The anionic water-soluble resin can be, for example, a copolymer obtained by reacting the mixture of one or two or more of carboxyl group-containing unsaturated monomers (including acid anhydride group-containing unsaturated monomer that imparts a carboxyl group by opening a cyclic compound) and one or two or more of unsaturated monomers. Examples of the carboxyl group-containing unsaturated monomer include acrylic acid, methacrylic acid, itaconic acid, maleic acid, maleic anhydride, maleic monoalkylester, citraconic acid, citraconic anhydride, and citraconic monoalkylester. Examples of the unsaturated monomer include styrene monomers such as styrene, α-methyl styrene, and vinyl toluene; aralkyl methacrylate or acrylate such as benzyl methacrylate and benzyl acrylate; and alkyl methacrylate or acrylate such as methyl methacrylate, butyl methacrylate, 2-ethyl hexyl methacrylate, stearyl methacrylate, lauryl methacrylate, methyl acrylate, butyl acrylate, 2-ethyl hexyl acrylate, stearyl acrylate, and lauryl acrylate. Preferably, the anionic water-soluble resin is a copolymer obtained by reacting the mixture of the monomers selected so as to have a glass-transition temperature of 0° C. to 80° C. Examples of the basic compound include alkali metal hydroxide such as sodium hydroxide and potassium hydroxide; and organic basic compounds such as triethylamine, monoethanolamine, triethanolamine, and triethylenediamine.

The amount of the polymer dispersant to be used relative to 100 parts by weight of the white pigment is, for example, 10 parts by weight to 40 parts by weight or 15 parts by weight to 30 parts by weight.

The white ink may further contain at least one of a nonionic resin emulsion and an anionic resin emulsion, for example. Examples of the nonionic resin emulsion and the anionic resin emulsion include urethan resin emulsions, acrylic resin emulsions, and styrene resin emulsions. In the total amount of the white ink, the content of the polymer dispersant (D), the content of the nonionic resin emulsion (N), and the content of the anionic resin emulsion (A) satisfy the following conditions (i) to (iii), for example.

$$D:(N+A)=1:3 \text{ to } 1:10 \qquad \text{Condition (i)}$$

$$N/D \leq 8 \qquad \text{Condition (ii)}$$

$$A/D \leq 12 \qquad \text{Condition (iii)}$$

The total solid content of the white pigment, the polymer dispersant, the nonionic resin emulsion, and the anionic resin emulsion relative to the total amount of the white ink is, for example, 25 wt % to 45 wt %.

Besides them, the white ink may contain a moisturizer, a surfactant, a pH adjuster, a viscosity modifier, a surface tension modifier, and a mildewproofing agent, for example. The moisturizer prevents the white ink from drying, for example. Examples of the moisturizer include ketoalcohol such as diacetone alcohol; polyalcohol such as polyalkylene glycol, alkylene glycol, glycerin, and trimethylolpropane; 2-pyrrolidone; N-methyl-2-pyrrolidone; and 1,3-dimethyl-2-imidazolidinone. The surfactant adjusts the surface tension of the white ink and improves the dispersibility of the white pigment, for example.

Figure 3:
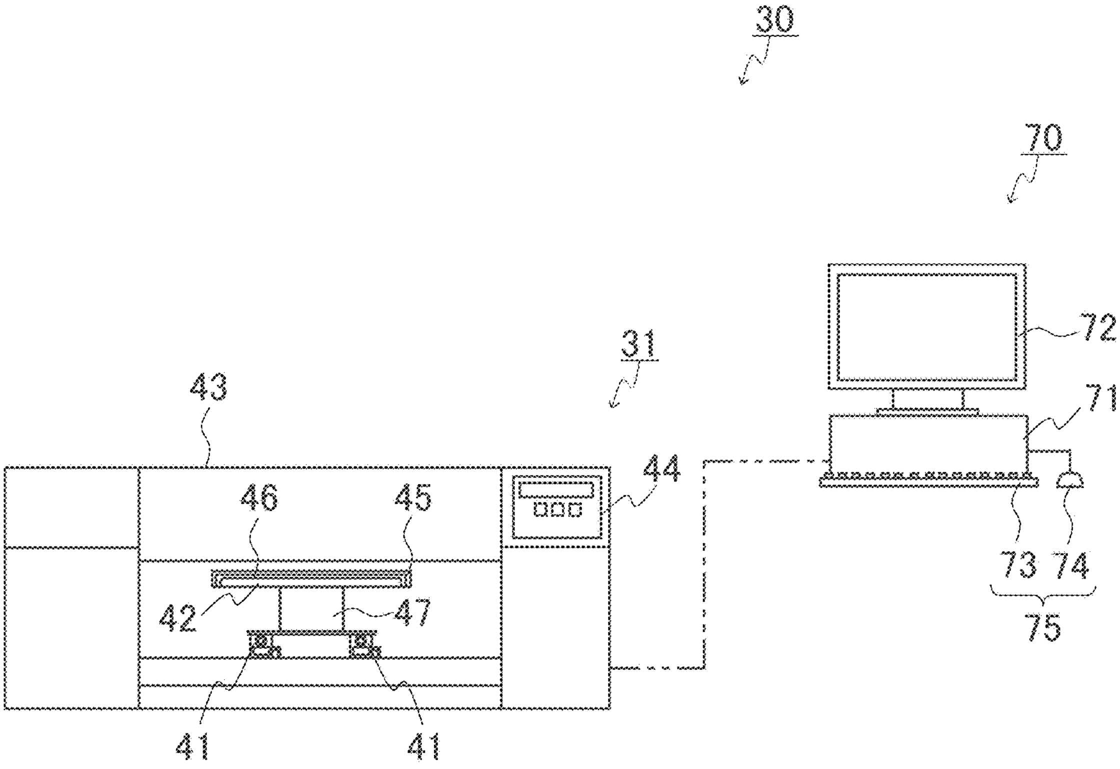
FIG. 3 is a schematic view showing an example configuration of an ink-jet recording apparatus.

The image printing step can be performed by using, for example, the ink-jet recording apparatus shown in FIG. 3. As shown in FIG. 3, the ink-jet recording apparatus 30 is configured such that an ink-jet printer 31 configured to record a desired image by ejecting an ink to fabric and a recording control unit 70 configured to acquire the image data of the desired image and control the ink-jet printer 31 are connected via an interface.

Figure 4:
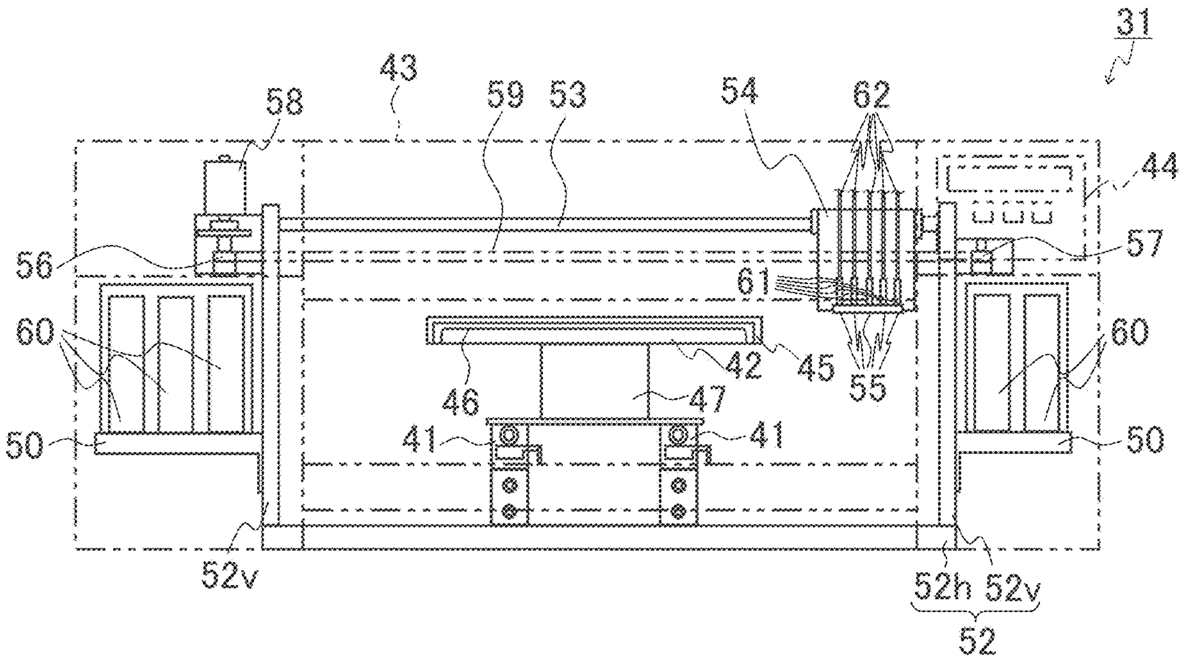
FIG. 4 is a front view showing an example configuration of an ink-jet printer of the ink-jet recording apparatus shown in FIG. 3.

The ink-jet printer 31 is provided with a frame 52 as shown in FIG. 4. The frame 52 includes a horizontal portion **52*h* located at the bottom of the printer 31 and two vertical portions 52*v* vertically rising from the both ends of the horizontal portion 52*h*. In FIG. 4, identical parts to those shown in FIG. 3 are indicated with identical numerals and symbols. The same applies to FIGS. 5A to 6**.

A slide rail 53 is horizontally extended so as to link the upper parts of the two vertical portions **52*v*. The slide rail 53 is provided with a carriage 54 which is slidable along the longitudinal direction (main scanning direction) of the slide rail 53. On the lower surface of the carriage 54, five piezoelectric ink-jet heads (ink ejecting units) 55** for ejecting five colors of inks, respectively, are provided.

Pulleys 56 and 57 are supported by the upper parts of the two vertical portions **52*v*. The motor shaft of a motor 58 is linked to one of the pulleys (pulley 56), which is supported by the vertical portion 52*v*. An endless belt 59 is extended between the pulleys 56 and 57, and the carriage 54 is fixed on an appropriate part of the endless belt 59**.

With such a configuration, in response to the forward and reverse rotations of one of the pulleys (pulley 56) driven by the motor 58, the carriage 54 is linearly reciprocated along the longitudinal direction (main scanning direction) of the slide rail 53. As a result, the ink-jet head 55 is reciprocated.

A mounting portion 50 to which ink cartridges 60 are detachably mounted is formed on each of the two vertical portions **52*v*. The ink cartridges 60 of two colors can be mounted on one of the two mounting portions 50 and the ink cartridges 60 of three colors can be mounted on the other of the two mounting portions 50. Ink bags (not shown) provided in the ink cartridges 60 are connected to five ink tanks 61 located above the ink-jet heads 55, respectively, through flexible tubes 62. Since the five ink tanks 61 are in communication with the ink-jet heads 55 as described below, inks are supplied from the ink cartridges 60 to the ink-jet heads 55**.

On the horizontal portion **52*h* of the frame 52, a slide mechanism 41 is provided as a carrying unit, and a platen (support) 42 is supported by the slide mechanism 41 from below. The platen 42 is provided with a fixing frame (fixing unit) 45 configured to position fabric such as a T-shirt with the surface including an area to be recorded up and set the T-shirt in the state where it is tautly stretched and has no wrinkles or unevenness. The ink-jet printer 31 of this example includes one platen 42**. The number of the platens however is not limited to one in the present invention and can be increased as needed.

In order to reciprocate the platen 42 in the direction perpendicular to the paper surface in FIG. 4 (sliding direction of slide mechanism 41, subscanning direction of ink-jet printer 31), a platen feeding mechanism (not shown) is provided. As the platen feeding mechanism, for example, a rack-and-pinion mechanism, a mechanism using an endless belt, and the like can be applied.

Figure 5A:
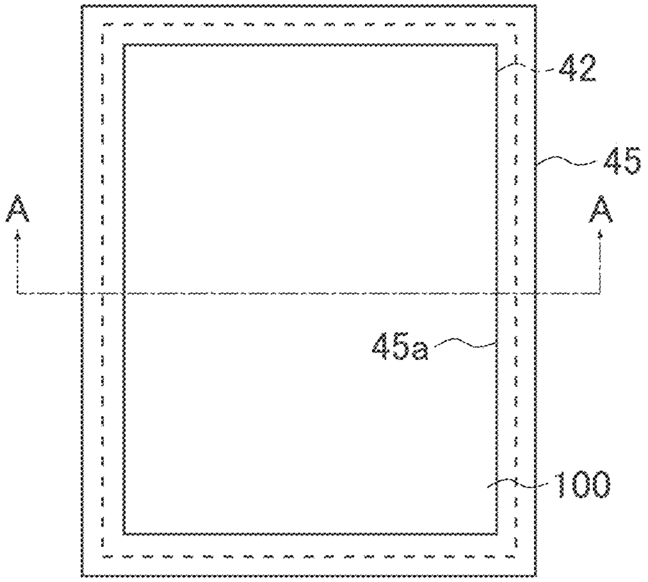
FIG. 5A is a plan view showing the state where fabric is set on a platen of the ink-jet recording apparatus shown in FIG. 3.
Figure 5B:
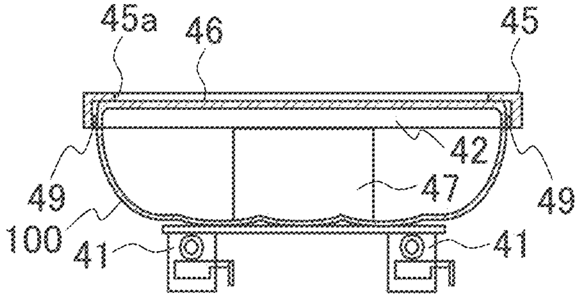
FIG. 5B is a cross-sectional view taken along line A-A of FIG. 5A.

As shown in FIGS. 5A and 5B, the platen 42 is a rectangle having the longitudinal direction in the subscanning direction in a planer view and includes a support surface 46 for supporting a T-shirt 100. The lower surface of the platen 42 at the farthest side in the direction perpendicular to the paper surface in FIG. 5B is linked to the slide mechanism 41 at the facing position through a support member 47.

The fixing frame 45 having an L-shaped cross section is configured to cover the four sides of the support surface 46 of the platen 42. An opening **45*a* having an opening area slightly smaller than the area of the support surface 46 of the platen 42 is formed on the surface of the fixing frame 45 facing the support surface 46 of the platen 42. In setting of the T-shirt 100 on the platen 42, the T-shirt 100 is placed on the platen 42 from the hem side in such a manner that the support surface 46 of the platen 42 is covered with the T-shirt 100 and the T-shirt 100 is fixed with the fixing frame 45. The fixing frame 45 is provided rotatably by a rotation portion (not shown) provided at the end of the platen 42, positioned at the farthest side in the direction perpendicular to the paper surface in FIG. 5B, and the T-shirt 100 is fixed between the platen 42 and the fixing frame 45 by rotating the fixing frame 45 so as to fit to the platen 42 after covering the platen 42 with the T-shirt 100**.

The ink-jet printer 31 includes a cover 43. The ink-jet heads 55, the slide mechanism 41, and the like are covered with the cover 43. The cover 43 is perspectively illustrated by chain double-dashed lines in FIG. 4. An operation panel 44 provided with a liquid crystal panel and operation buttons is provided at the right upper part of the front surface of the cover 43.

The five ink-jet heads 55 shown in FIG. 4 correspond to the inks of five colors (white, yellow, magenta, cyan, and black), are arranged in parallel along the reciprocating direction of the carriage 54, and are in communication with the corresponding ink cartridges 60 through the flexible tubes 62 and the ink tanks 61. As the configuration for supplying inks to the ink-jet heads, for example, a conventionally known configuration may be adopted (for example, see JP 2004-291461 A). As to the five ink-jet heads 55, a head unit including ejection units configured to eject the inks of four colors (yellow, magenta, cyan, and black), respectively, and a head unit including an ejection unit configured to eject a white ink may be aligned in the subscanning direction.

The ink-jet heads 55 are disposed in such a manner that a small gap is formed between the lower surfaces of the ink-jet heads 55 and the support surface 46 of the platen 42, and an area to be recorded of the T-shirt 100 set on the platen 42 is fed to the gap when an image is recorded on the T-shirt 100. With this configuration, by reciprocating the ink-jet heads 55 by the carriage 54 while ejecting the color inks from multiple ejection nozzles with micro-diameters formed on the bottom surfaces of the ink-jet heads 55 to the T-shirt 100, the color inks are held on the surface of fabric. As a result, a desired color image is recorded on the T-shirt 100.

The recording control unit 70 shown in FIG. 3 is, for example, configured by using a general-purpose personal computer (PC) and includes a main body 71, a display as a display portion 72, and a keyboard 73 and a mouse (pointing device) 74 as an operation portion 75.

Figure 6:
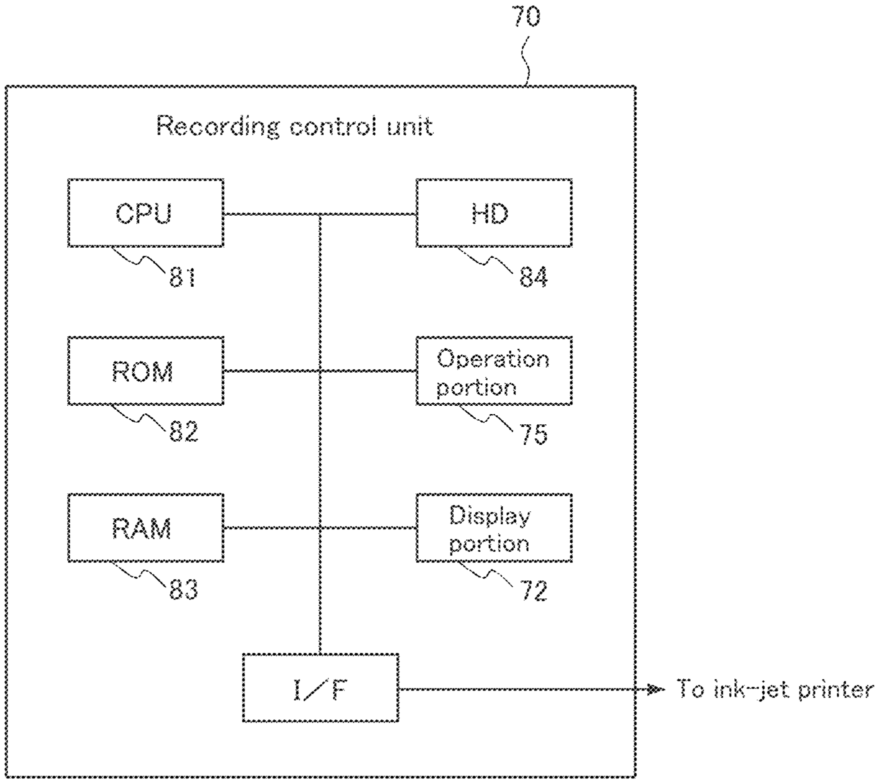
FIG. 6 is a block diagram showing the configuration of a recording control unit of the ink-jet recording apparatus shown in FIG. 3.

As shown in FIG. 6, the recording control unit 70 includes a central processing unit (CPU) 81, a read only memory (ROM) 82, a random access memory (RAM) 83, a hard disk (HD) 84, an operation portion 75, a display portion 72, and an interface (I/F) 85, and they are connected one another via a bus.

The HD 84 stores various programs for use in control of the operation of the recording control unit 70. The HD 84 further stores various pieces of image data downloaded via the internet or the like or created by software and various pieces of data of every kind of fabric such as a T-shirt. The CPU 81 performs various operations and processes based on signals input with the operation portion 75 and various programs and data stored in the ROM 82, the RAM 83, and the HD 84. The CPU 81 sends data and the like to the ink-jet printer 31 via the interface 85. The RAM 83 is a volatile storage device which is readable and writable and stores results of the operations and the like obtained in the CPU 81. The interface 85 is connected to the interface of the ink-jet printer 31 and allows communication between the recording control apparatus 70 and the ink-jet printer 31.

The recording of a desired image on the T-shirt 100 by using the ink-jet recording apparatus 30 of the present example can be performed as follows, for example. First, the ink-jet recording apparatus 30 acquires the data of a desired image to be recorded on the T-shirt 100 via the keyboard 73 and the mouse 74 of the recording control unit 70. As to the acquisition of the image data, the image data is created by using software installed in the recording control unit 70 or the image data preliminarily stored in the HD 84 is selected.

Next, the T-shirt 100 is fixed to the platen 42. That is, the T-shirt 100 is placed on the platen 42 from the hem side, stretched along the support surface 46 of the platen 42, and fixed with the fixing frame 45 in the state of having no wrinkles.

In response to the instruction of recording by a user, the image data is sent to the ink-jet printer 31 via the interface 85, inks are ejected from the ink-jet heads 55 based on this image data, and an image is recorded on the T-shirt 100 fixed on the platen 42.

An image is printed on fabric by the ink-jet recording method in this example. The present invention, however, is not limited thereto. Besides the ink-jet recording method, an image may be printed on fabric, for example, by the silk screen printing method in the present invention.

Subsequently, the overcoating step of applying the overcoat to the ink printed on the fabric or the fabric to be printed with the ink is performed. The timing of performing the overcoating step is not limited. For example, the overcoat may be applied to the ink printed on the fabric after the image printing step or the overcoat may be applied to the fabric to be printed with the ink prior to the image printing step.

In the overcoating step, the overcoat may be applied, for example, by a spraying method, a brushing method, a stamping method, an ink-jet method, or a method using a roller.

Figure 2:
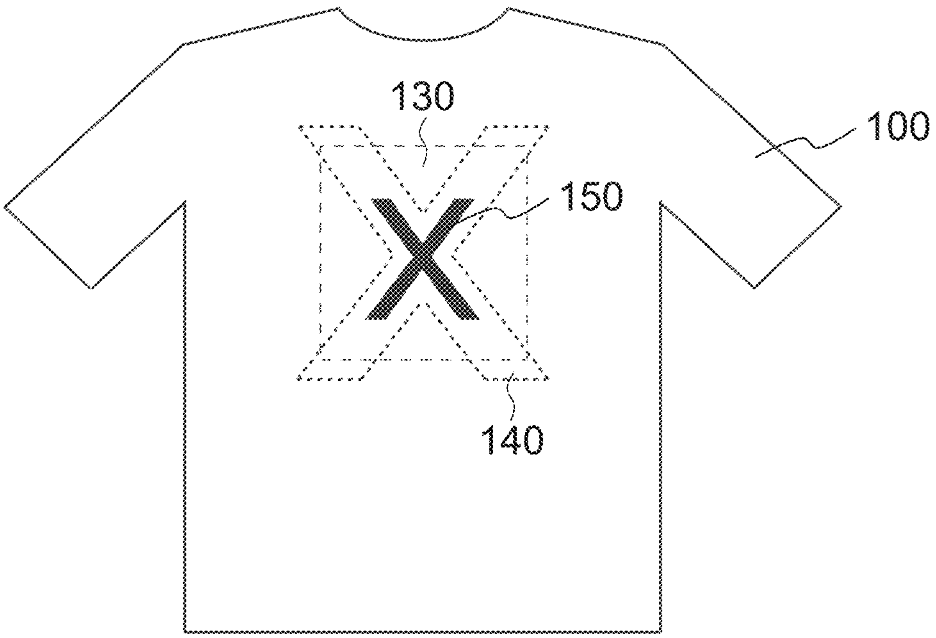
FIG. 2 is an illustration showing an example application of an overcoat in a method for forming an image.

In the overcoating step, the overcoat is applied to at least an area having substantially the same size as an area printed with an ink, and is preferably applied to an area larger than the printed area. For example, as shown in FIG. 2, when the letter "X" 150 is printed on the fabric (T-shirt in this example) 100, the overcoat is preferably applied to form an overcoat-applied area 140 having a line width wider than that of the letter 150. There is no harm in creating an overlapped area and a non-overlapped area of the overcoat-applied area 140 and the treatment agent-applied area 130 as shown in FIG. 2.

Subsequently, the heat-fixing step of thermally fixing the ink on the fabric by using a heating unit configured to heat the printed area of the fabric is performed. The heating unit can be, for example, a noncontact heating unit such as a commercially available oven and conveyor belt oven configured to heat the printed area of the fabric without being in contact with the printed area or a contact heating unit such as a commercially available hot pressing machine configured to heat the printed area of the fabric while being in contact with the printed area. The temperature in the heat-fixing step is, for example, 160° C. to 185° C.

The fabric printed by a conventional printing method has a problem that a hole(s) or a crack(s) of the ink layer (film) is caused when the heat-fixing step is performed by using a noncontact heating unit such as an oven and that the hole(s) or the crack(s) increases by washing. It is presumed that these problems are caused by the following mechanism, for example. That is, when the noncontact heating unit is used for the heat-fixing, the resins in the ink align less neatly on the surface of the fabric as compared to the case of using the contact heating unit such as a hot pressing machine. It is presumed that this causes insufficient fixability of the ink, which decreases the washing fastness. In this regard, according to the image forming method, by applying the overcoat to the ink printed on the fabric or the fabric to be printed with the ink, a hole(s) or a crack(s) of the ink layer (film) can be prevented from being caused. It is presumed that such an effect can be achieved as follows. That is, the carbodiimide group-containing compound contained in the overcoat and the resin contained in the ink form a crosslinking structure in the heat-fixing step, which improves the fixability and washing fastness of the ink. The present invention, however, is not limited to this presumption. As demonstrated in the comparative examples below, the overcoat containing polyisocyanate or polyamine as a reactive polymer instead of the carbodiimide group-containing compound cannot achieve an effect of preventing a hole(s) or a crack(s) of the ink layer (film) from being caused. While the overcoat containing the oxazoline group-containing compound achieves an effect of preventing a hole(s) or a crack(s) of the ink layer (film) from being caused, the overcoat containing the carbodiimide group-containing compound has a longer usable period (expiration date) than the overcoat containing the oxazoline group-containing compound. When the ink contains the carbodiimide group-containing compound, there is a case that the crosslinking structure of the carbodiimide group-containing compound and the resin is formed in the ink during storage of the ink, which causes aggregation and shortens the usable period of the ink. In this regard, in the present invention, since the overcoat that is independent of the ink contains the carbodiimide group-containing compound, the usable period of the ink is not shortened. The isocyanate group contained in the polyisocyanate can be crosslinked with an amino group, a hydroxyl group, and the like, the diallyl group contained in the polyamine can be crosslinked with an acrylate group and the like, and the oxazoline group contained in the oxazoline group-containing compound can be crosslinked with a carboxyl group, aromatic thiol, phenol, and the like. These functional groups are generally contained in the ink used in combination with the overcoat.

EXAMPLES

The examples are described below together with comparative examples. The present invention, however, is by no means limited thereto.

Examples 1-1 to 1-4 and Comparative Examples 1-1 and 1-2

Components of the overcoat composition (Table 1) were stirred and mixed, thereby obtaining overcoats of Examples 1-1 to 1-4 and Comparative Examples 1-1 and 1-2 shown in Table 1.

By using each of the overcoats of Examples 1-1 to 1-4 and Comparative Examples 1-1 and 1-2, an image was formed on a black T-shirt (material: cotton 100%) by the following steps.

Treatment Step

A treatment agent was applied to the image-forming surface of the T-shirt by using a commercially available automatic pretreatment applying machine. As the treatment agent, a solution obtained by diluting an aqueous solution containing 25 wt % to 30 wt % calcium nitrate tetrahydrate, 5 wt % to 10 wt % diethylene glycol, and 5 wt % to 10 wt % calcium chloride with distilled water threefold was used.

Heat Treatment Step

Heat treatment was applied to the treatment agent-applied area of the T-shirt after the treatment step by using a heat pressing machine set at 180° C.

Image Printing Step

The letter (X) was printed by ejecting a white ink to a T-shirt by using a garment printer produced by Brother Industries, Ltd. As the white ink, an aqueous solution (water-based white ink) containing 10 wt % to 20 wt % titanium oxide, 15 wt % to 24 wt % diethylene glycol, and 1 wt % to 5 wt % silica was used.

Overcoating Step

Each of the overcoats of Examples 1-1 to 1-4 and Comparative Examples 1-1 and 1-2 was applied to the white ink on the T-shirt after the image printing step by the spraying method.

Heat-Fixing Step

The white ink was thermally fixed on the T-shirt by applying noncontact heating to the printed area of the T-shirt after the image printing step by using an oven set at 170° C.

As to Examples 1-1 to 1-4 and Comparative Examples 1-1 and 1-2, the ink film strength was evaluated visually according to the following evaluation criteria.

Ink Film Strength Evaluation

Evaluation Criteria:

G: The number of holes of the ink film was smaller than the case where the overcoat was not applied to the white ink; and NG: The number of holes of the ink film was larger than or equivalent to the case where the overcoat was not applied to the white ink.

Table 1 shows the composition and evaluation results of the overcoats of Examples 1-1 to 1-4 and Comparative Examples 1-1 and 1-2.

TABLE 1

| | | Examples | | | | Comparative Examples | |
|---|---|---|---|---|---|---|---|
| | | 1-1 | 1-2 | 1-3 | 1-4 | 1-1 | 1-2 |
| Carbodiimide group-containing compound | CARBODILITE ®E-03A (*1) | 5 | — | — | — | — | — |
| | CARBODILITE ®E-05 (*2) | — | 5 | — | — | — | — |
| | CARBODILITE ®V-02 (*3) | — | — | 5 | — | — | — |
| | CARBODILITE ®V-02-L2 (*4) | — | — | — | 5 | — | — |
| Polyisocyanate | H-01 (*5) | — | — | — | — | 5 | — |
| Polyamine | PAS-880 (*6) | — | — | — | — | — | 5 |
| Surfactant | BYK ®-349 (*7) | 0.3 | 0.3 | 0.3 | 0.3 | 0.3 | 0.3 |
| Water | | Balance | Balance | Balance | Balance | Balance | Balance |
| | Ink film strength | G | G | G | G | NG | NG |

Footnote of Table 1

(*1): Product of Nisshinbo Chemical Inc.; 40 wt % water emulsion (*2): Product of Nisshinbo Chemical Inc.; 40 wt % water emulsion (*3): Product of Nisshinbo Chemical Inc.; 40 wt % aqueous solution (*4): Product of Nisshinbo Chemical Inc.; 40 wt % aqueous solution (*5): Product of BASF SE; 100 wt % liquid (*6): Product of Nittobo Medical Co., Ltd.; 35 wt % aqueous solution (*7): Product of BYK Additives & Instruments; polyether-modified siloxane surfactant The content, which is an active ingredient, of each of the components in the table is expressed in wt %.

As summarized in Table 1, Examples 1-1 to 1-4 showed good results in the ink film strength evaluation. On the other hand, Comparative Examples 1-1 and 1-2 in each of which polyisocyanate or polyamine was used as a reactive polymer instead of the carbodiimide group-containing compound showed bad results in the ink film strength evaluation. Examples 1-1 to 1-4 showed good results in the ink film strength evaluation in the case of using the white ink with which a hole(s) of the ink film is conspicuous. Thus, it can be judged that Examples 1-1 to 1-4 will show good results in the ink film strength evaluation in the case of using a color ink. The same applies to the yellowing evaluation and the ink film tensile strength evaluation described below.

Examples 2-1 to 2-4

The L* value, the a* value, and the b* value of the overcoat-applied area of the T-shirt on which an image was formed in the same manner as in Examples 1-1 to 1-4 were measured with a colorimeter ("X-rite 939" produced by X-Rite Inc.). Furthermore, the color difference ΔE*ab value between the area to which the treatment agent, the white ink, and the overcoat were applied and the area (reference) to which the treatment agent and the white ink were applied but the overcoat was not applied was measured with the colorimeter.

Table 2 shows the composition and evaluation results of the overcoats of Examples 2-1 to 2-4.

TABLE 2

| | | Examples | | | | |
|---|---|---|---|---|---|---|
| | | 2-1 | 2-2 | 2-3 | 2-4 | Reference |
| Carbodiimide group-containing compound | CARBODILITE ®E-03A (*1) | 5 | — | — | — | — |
| | CARBODILITE ®E-05 (*2) | — | 5 | — | — | |
| | CARBODILITE ®V-02 (*3) | — | — | 5 | — | |
| | CARBODILITE ®V-02-L2 (*4) | — | — | — | 5 | |
| Surfactant | BYK ®-349 (*7) | 0.3 | 0.3 | 0.3 | 0.3 | |
| Water | | Balance | Balance | Balance | Balance | |
| | L* | 93.3 | 92.8 | 93.7 | 93.1 | 94.0 |
| | a* | −1.6 | −1.7 | −1.5 | −1.6 | −1.7 |
| | b* | 4.8 | 5.49 | 3.76 | 4.22 | −0.6 |
| | E*ab | 5.4 | 6.2 | 4.4 | 4.9 | — |

Footnote of Table 2
(*1): Product of Nisshinbo Chemical Inc.; 40 wt % water emulsion
(*2): Product of Nisshinbo Chemical Inc.; 40 wt % water emulsion
(*3): Product of Nisshinbo Chemical Inc.; 40 wt % aqueous solution
(*4): Product of Nisshinbo Chemical Inc.; 40 wt % aqueous solution
(*7): Product of BYK Additives & Instruments; polyether-modified siloxane surfactant
The content, which is an active ingredient, of each of the components in the table is expressed in wt %.

As summarized in Table 2, the L* value and the a* value of each of Examples 2-1 to 2-4 were not greatly different from those of the reference. On the other hand, in each of Examples 2-1 to 2-4, the b* value was larger than that of the reference and there was yellowing but at a reasonable level in practical use. Examples 2-3 and 2-4 in each of which the carbodiimide group-containing compound aqueous solution (water-soluble carbodiimide group-containing compound) was used showed smaller b* value than Examples 2-1 and 2-2 in each of which the carbodiimide group-containing compound water emulsion was used, and showed suppression of yellowing. Examples 2-3 and 2-4 showed smaller color difference ΔE*ab value than Examples 2-1 and 2-2.

Examples 3-1 to 3-9

Components of the overcoat composition (Table 3) were stirred and mixed, thereby obtaining overcoats of Examples 3-1 to 3-9 shown in Table 3.

By using each of the overcoats of Examples 3-1 to 3-9, an image was formed on the T-shirt by the following steps.

Treatment Step

The treatment agent was applied to the image-forming surface of the T-shirt in the same manner as in Examples 1-1 to 1-4.

Heat Treatment Step

Heat treatment was applied to the treatment agent-applied area of the T-shirt after the treatment step in the same manner as in Examples 1-1 to 1-4.

Image Printing Step

The letter (X) was printed by ejecting the white ink to a T-shirt by using the garment printer such that the ejection amount of the ink per unit area is in the range from 4.3 g/cm$^2$ to 25.6 g/cm$^2$ (white ink concentration: 17% to 100%).

Overcoating Step

Each of the overcoats of Examples 3-1 to 3-9 was applied to the white ink on the T-shirt after the image printing step in the same manner as in Examples 1-1 to 1-4.

Heat-Fixing Step

The white ink was thermally fixed on the T-shirt by applying noncontact heating to the printed area of the T-shirt after the image printing step in the same manner as in Examples 1-1 to 1-4.

The overcoats of Examples 3-1 to 3-9 were subjected to (a) an ink film tensile strength evaluation, (b) a yellowing evaluation, and (c) a storage stability evaluation by the following methods.

(a) Ink Film Tensile Strength Evaluation

The T-shirt was washed together with a load cloth by using a household fully automatic washing machine and dried by using a tumbler dryer. The ink film tensile strength before washing and the ink film tensile strength after drying were evaluated according to the following evaluation criteria. When the white ink concentration at which a crack(s) of the ink film is caused is low, it means that a crack(s) of the ink film is caused with only a small ejection amount of the ink per unit area, which suggests that the ink is superior in ink film tensile strength.

Ink Film Tensile Strength Evaluation

Evaluation Criteria:

A: The white ink concentration at which a crack(s) of the ink film is caused was 50% or less when the T-shirt was stretched at 8N; and B: The white ink concentration at which a crack(s) of the ink film is caused exceeded 50% when the T-shirt was stretched at 8N.

(b) Yellowing Evaluation

As to the overcoat-application area of the T-shirt where a crack(s) of the ink film was not caused in the ink film tensile strength evaluation before the washing, the color difference ΔE*ab value between the case of applying the treatment agent, the white ink, and the overcoat and the case (reference) of applying the treatment agent and the white ink but not applying the overcoat was measured with the colorimeter, and the evaluation was made according to the following evaluation criteria.

Yellowing Evaluation

Evaluation Criteria:

A: The color difference ΔE*ab value was less than 2.0; and

B: The color difference ΔE*ab value was 2.0 or more.

(c) Storage Stability Evaluation

Each of the overcoats of Examples 3-1 to 3-9 sealed in an airtight container was stored in a thermostat bath at 60° C. for one week, and the evaluation was visually made according to the following evaluation criteria. In the storage stability evaluation, the presence of the aggregate suggests that carbodiimide group-containing compounds in the overcoat have already been crosslinked. Thus, it can be considered that even if the overcoat is applied to the ink, the effect of preventing a hole(s) or a crack(s) of the ink film from being caused is less likely to be obtained.

Storage Stability Evaluation

Evaluation Criteria:

A: There was no aggregate; and

B: There was an aggregate but at a reasonable level in practical use.

Table 3 shows the composition and evaluation results of the overcoats of Examples 3-1 to 3-9.

3-6 each satisfying C/R≤0.375 showed better results in the storage stability evaluation than Examples 3-7 to 3-9 each satisfying C/R>0.375.

Example 4-1 to 4-6

By using each of the overcoats of Examples 3-1 to 3-6 after the heat-fixing step, the color difference ΔE*ab value between the area to which the treatment agent, the white ink, and the overcoat were applied and the area (reference) to which the treatment agent and the white ink were applied but the overcoat was not applied was measured over time with the colorimeter, thereby completing Examples 4-1 to 4-6. The results are shown in the graph of FIG. 7.

Figure 7:
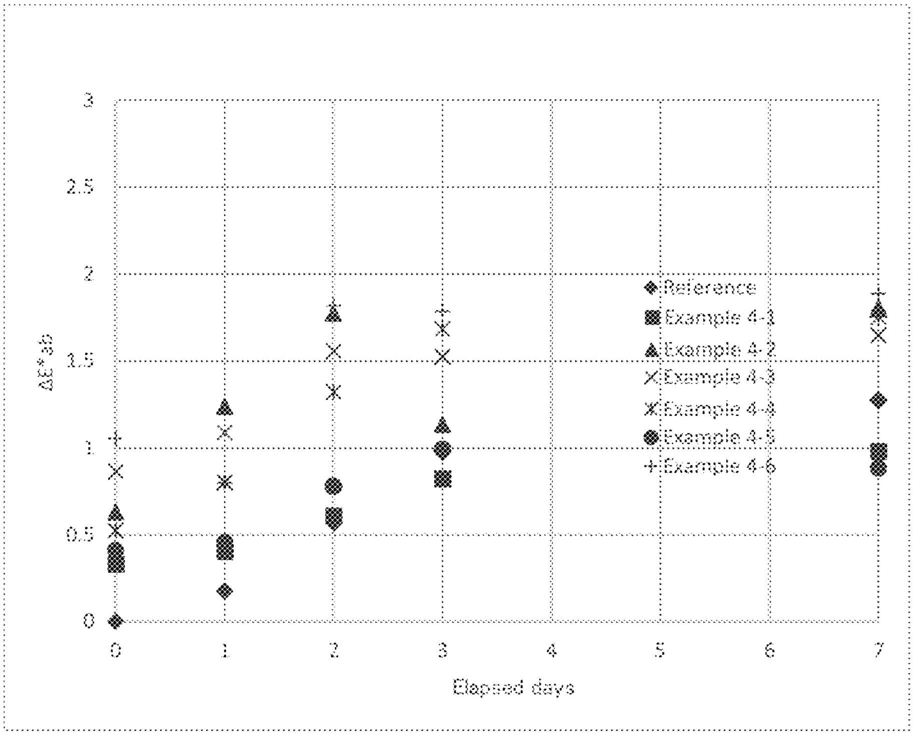
FIG. 7 is a graph showing the change over time of the color difference ΔE*ab value between the area to which the overcoat was applied and the area (reference) to which the overcoat was not applied in Examples 4-1 to 4-6.

As shown in FIG. 7, the color difference ΔE*ab value between the area to which the treatment agent, the white ink, and the overcoat were applied and the area (reference) to which the treatment agent and the white ink were applied but the overcoat was not applied right after the heat-fixing step (0 day) was about 1 at the maximum. While the color difference ΔE*ab value was increased over time, there was not a big change between the color difference ΔE*ab value 3 days after the heat-fixing step and the color difference ΔE*ab value 7 days after the heat-fixing step, which suggests that the color difference ΔE*ab value remains 2 or less even after a long period. It can be considered that when the content of the carbodiimide group-containing compound exceeds 0.75 wt % as in the overcoat of Example 3-7, the color difference ΔE*ab value exceeds 2.0, 3 days after the heat-fixing step.

TABLE 3

| | | Examples | | | | | | | | |
|---|---|---|---|---|---|---|---|---|---|---|
| | | 3-1 | 3-2 | 3-3 | 3-4 | 3-5 | 3-6 | 3-7 | 3-8 | 3-9 |
| Carbodiimide group-containing compound (C) | CARBODILITE ®V-02 (*3) | 0.10 | 0.25 | 0.35 | 0.50 | 0.65 | 0.75 | 0.90 | 1.0 | 2.0 |
| Resin (R) | Mowinyl ®-Powder730L (*8) | 2.0 | 2.0 | 2.0 | 2.0 | 2.0 | 2.0 | 2.0 | 2.0 | 2.0 |
| Surfactant | BYK ®-349 (*7) | 0.3 | 0.3 | 0.3 | 0.3 | 0.3 | 0.3 | 0.3 | 0.3 | 0.3 |
| Glycerin | | 50.0 | 50.0 | 50.0 | 50.0 | 50.0 | 50.0 | 50.0 | 50.0 | 50.0 |
| Water | | Balance | Balance | Balance | Balance | Balance | Balance | Balance | Balance | Balance |
| C/R | | 0.050 | 0.125 | 0.175 | 0.250 | 0.325 | 0.375 | 0.450 | 0.500 | 1.00 |
| Ink film tensile strength | Before washing | A | A | A | A | A | A | — | — | — |
| | After drying | B | A | A | A | A | A | — | — | — |
| | Yellowing | A | A | A | A | A | A | — | — | — |
| | Storage Stability | A | A | A | A | A | A | B | B | B |

Footnote of Table 3

(*3): Product of Nisshinbo Chemical Inc.; 40 wt % aqueous solution (*8): Product of Nippon Synthetic Chemical Industry Co., Ltd.; acrylic resin (*7): Product of BYK Additives & Instruments; polyether-modified siloxane surfactant The content, which is an active ingredient, of each of the components in the table is expressed in wt %.

As summarized in Table 3, in each of Examples 3-1 to 3-9, the evaluation results of the ink film tensile strength, yellowing, and storage stability were at a reasonable level in practical use. Examples 3-2 to 3-5 in each of which the content of the carbodiimide group-containing compound (C) was 0.25 wt % or more showed better results in the ink film tensile strength evaluation after drying than Example 3-1 in which the content of the carbodiimide group-containing compound (C) was less than 0.25 wt %. Examples 3-1 to 3-5 in each of which the content of the carbodiimide group-containing compound (C) was 0.75 wt % or less showed good results in the yellowing evaluation. Examples 3-1 to Examples 5-1 to 5-16

Components of the overcoat composition (Table 4) were stirred and mixed, thereby obtaining overcoats of Examples 5-1 to 5-16 shown in Table 4. It can be considered that the results of Examples 5-1 to 5-16 shown in Table 4 can be obtained either with the overcoat containing the carbodiimide group-containing compound or the overcoat containing no carbodiimide group-containing compound.

By using each of the overcoats of Examples 5-1 to 5-16, an image was formed on the T-shirt by the following steps.

Treatment Step

The treatment agent was applied to the image-forming surface of the T-shirt in the same manner as in Examples 1-1 to 1-4.

Heat Treatment Step

Heat treatment was applied to the treatment agent-applied area of the T-shirt after the treatment step in the same manner as in Examples 1-1 to 1-4.

Image Printing Step

The letter (X) was printed by ejecting the white ink to a T-shirt in the same manner as in Examples 1-1 to 1-4.

Overcoating Step

Each of the overcoats of Examples 5-1 to 5-16 was applied to the white ink on the T-shirt after the image printing step by a spraying method in such a manner that an overlapped area and a non-overlapped area of the treatment agent and the overcoat were created.

Heat-Fixing Step

The white ink was thermally fixed on the T-shirt by applying noncontact heating to the printed area of the T-shirt after the image printing step in the same manner as in Examples 1-1 to 1-4.

The overcoats of Examples 5-1 to 5-16 were subjected to an overcoat marks evaluation by the following methods.

Overcoat Marks Evaluation Method

The T-shirt was washed in the same manner as in Examples 3-1 to 3-9. The color difference ΔE*ab value between the area to which the treatment agent and the overcoat were applied and the area to which only the treatment agent was applied (treatment agent-applied area) and the color difference ΔE*ab value between the area to which the treatment agent and the overcoat were applied and the area to which nothing was applied (treatment agent non-applied area) before washing and after drying were measured with a colorimeter, and the evaluation was made according to the following evaluation criteria.

Overcoat Marks Evaluation

Evaluation Criteria:

A: The color difference ΔE*ab value was less than 2.0; and

B: The color difference ΔE*ab value was 2.0 or more.

Table 4 shows the composition and evaluation results of the overcoats of Examples 5-1 to 5-16.

TABLE 4

| | | | Examples | | | | | | | |
|---|---|---|---|---|---|---|---|---|---|---|
| | | | 5-1 | 5-2 | 5-3 | 5-4 | 5-5 | 5-6 | 5-7 | 5-8 |
| Resin | | Mowinyl ®-Powder730L (*8) | 5 | — | — | — | — | — | 5 | — |
| | | Mowinyl ®-Powder966A (*9) | — | 5 | — | — | — | — | — | 5 |
| | | Vylonal MD-1480 (*10) | — | — | 5 | — | — | — | — | — |
| | | Vylonal MD-2000 (*11) | — | — | — | 5 | — | — | — | — |
| | | UCOAT ®UX-320 (*12) | — | — | — | — | 5 | — | — | — |
| | | BONTIGHTER ®HUX-564 (*13) | — | — | — | — | — | 5 | — | — |
| Surfactant | | BYK ®-307 (*14) | 0.3 | 0.3 | 0.3 | 0.3 | 0.3 | 0.3 | — | — |
| | | BYK ®-349 (*7) | — | — | — | — | — | — | 0.3 | 0.3 |
| | | BYK ®-377 (*15) | — | — | — | — | — | — | — | — |
| Water | | | Balance | Balance | Balance | Balance | Balance | Balance | Balance | Balance |
| Overcoat marks | Before washing | Treatment agent non-applied area | B | B | A | A | B | B | A | A |
| | | Treatment agent-applied area | A | A | B | A | B | B | A | A |
| | After washing | Treatment agent non-applied area | A | A | A | A | B | B | A | A |
| | | Treatment agent-applied area | A | A | B | B | B | B | A | A |

| | | | Examples | | | | | | | |
|---|---|---|---|---|---|---|---|---|---|---|
| | | | 5-9 | 5-10 | 5-11 | 5-12 | 5-13 | 5-14 | 5-15 | 5-16 |
| Resin | | Mowinyl ®-Powder730L (*8) | — | — | — | — | 5 | — | — | — |
| | | Mowinyl ®-Powder966A (*9) | — | — | — | — | — | 5 | — | — |
| | | Vylonal MD-1480 (*10) | 5 | — | — | — | — | — | 5 | — |
| | | Vylonal MD-2000 (*11) | — | — | — | — | — | — | — | — |
| | | UCOAT ®UX-320 (*12) | — | 5 | 5 | — | — | — | — | 5 |
| | | BONTIGHTER ®HUX-564 (*13) | — | — | — | 5 | — | — | — | — |
| Surfactant | | BYK ®-307 (*14) | — | — | — | — | — | — | — | — |
| | | BYK ®-349 (*7) | 0.3 | 0.3 | 0.3 | 0.3 | — | — | — | — |
| | | BYK ®-377 (*15) | — | — | — | — | 0.3 | 0.3 | 0.3 | 0.3 |
| Water | | | Balance | Balance | Balance | Balance | Balance | Balance | Balance | Balance |
| Overcoat marks | Before washing | Treatment agent non-applied area | A | A | B | B | B | B | A | B |
| | | Treatment agent-applied area | B | A | B | B | A | A | B | B |
| | After washing | Treatment agent non-applied area | A | A | B | B | B | B | A | B |

TABLE 4-continued

| | | | | | | | | |
|---|---|---|---|---|---|---|---|---|
| Treatment agent-applied area | A | A | B | B | A | A | B | B |

Footnote of Table 4
(*8): Product of Nippon Synthetic Chemical Industry Co., Ltd.; acrylic resin
(*9): Product of Nippon Synthetic Chemical Industry Co., Ltd.; styrene-acrylic resin
(*10): Product of TOYOBO CO., LTD.; polyester resin
(*11): Product of TOYOBO CO., LTD.; polyester resin
(*12): Product of Sanyo Chemical Industries, Ltd.; urethan resin
(*13): Product of ADEKA CORPORATION; urethan resin
(*14): Product of BYK Additives & Instruments; polyether-modified polydimethylsiloxane surfactant
(*7): Product of BYK Additives & Instruments; polyether-modified siloxane surfactant
(*15): Product of BYK Additives & Instruments; hydroxyl group-containing polyether-modified polydimethylsiloxane surfactant
The content, which is an active ingredient, of each of the components in the table is expressed in wt %.

As summarized in Table 4, the overcoat marks evaluation results of Examples 5-1 to 5-16 were each at a reasonable level in practical use. Examples 5-1, 5-2, 5-7, 5-8, 5-13, and 5-14 in which an acrylic resin or a styrene-acrylic resin was used showed good results in the overcoat marks evaluation in the treatment agent-applied area both in the cases of before washing and after drying. Among them, Examples 5-7 and 5-8 in which a polyether-modified siloxane surfactant was used showed good results in the overcoat marks evaluation also in the treatment agent non-applied area both in the cases of before washing and after drying.

Examples 6-1 to 6-3

Components of the overcoat composition (Table 5) were stirred and mixed, thereby obtaining overcoats of Examples 6-1 to 6-3 shown in Table 5.

By using each of the overcoats of Examples 6-1 to 6-3, an image was formed on the T-shirt in the same manner as in Examples 3-1 to 3-9.

The overcoats of Examples 6-1 to 6-3 were subjected to (a) an ink film tensile strength evaluation, (b) a yellowing evaluation, and (c) a storage stability evaluation in the same manner as in Examples 3-1 to 3-9.

Table 5 shows the composition and evaluation results of the overcoats of Examples 6-1 to 6-3.

TABLE 5

| | | Examples | | |
|---|---|---|---|---|
| | | 6-1 | 6-2 | 6-3 |
| Carbodiimide group-containing compound (C) | CARBODILITE ®V-02 (*3) | 0.50 | 0.50 | 0.50 |
| Resin (R) | Mowinyl ®-Powder730L (*8) | 1.0 | 2.0 | 3.0 |
| Surfactant | BYK ®-349 (*7) | 0.3 | 0.3 | 0.3 |
| Glycerin | | 50.0 | 50.0 | 50.0 |
| Water | | Balance | Balance | Balance |
| C/R | | 0.50 | 0.25 | 0.17 |
| Ink film tensile strength | Before washing | A | A | A |
| | After drying | A | A | A |
| | Yellowing | A | A | A |
| | Storage stability evaluation | B | A | A |

Footnote of Table 5
(*3): Product of Nisshinbo Chemical Inc.; 40 wt % aqueous solution
(*8): Product of Nippon Synthetic Chemical Industry Co., Ltd.; acrylic resin
(*7): Product of BYK Additives & Instruments; polyether-modified siloxane surfactant
The content, which is an active ingredient, of each of the components in the table is expressed in wt %.

As summarized in Table 5, all of Examples 6-1 to 6-3 showed good results in the ink film tensile strength evaluation and the yellowing evaluation. Examples 6-2 and 6-3 each satisfying C/R≤0.375 showed good results also in the storage stability.

Examples 7-1 to 7-4

Components of the overcoat composition (Table 6) were stirred and mixed, thereby obtaining overcoats of Examples 7-1 to 7-4 shown in Table 6.

By using each of the overcoats of Examples 7-1 to 7-4, an image was formed on the T-shirt in the same manner as in Examples 3-1 to 3-9.

The overcoats of Examples 7-1 to 7-4 were subjected to (a) an ink film tensile strength evaluation, (b) a yellowing evaluation, and (c) a storage stability evaluation in the same manner as in Examples 3-1 to 3-9.

Table 6 shows the composition and evaluation results of the overcoats of Examples 7-1 to 7-4.

TABLE 6

| | | Examples | | | |
|---|---|---|---|---|---|
| | | 7-1 | 7-2 | 7-3 | 7-4 |
| Carbodiimide group-containing compound | CARBODILITE ®V-02 (*3) | 0.50 | 0.50 | 0.50 | 0.50 |
| Resin | Mowinyl ®-Powder730L (*8) | 2.0 | 2.0 | 2.0 | 2.0 |
| Surfactant | BYK ®-349 (*7) | 0.3 | 0.3 | 0.3 | 0.3 |
| Glycerin | | 30.0 | 50.0 | 60.0 | 75.0 |
| Water | | Balance | Balance | Balance | Balance |
| Ink film tensile strength | Before washing | A | A | — | — |
| | After drying | A | A | — | — |

TABLE 6-continued

| | Examples | | | |
|---|---|---|---|---|
| | 7-1 | 7-2 | 7-3 | 7-4 |
| Yellowing | A | A | — | — |
| Storage stability evaluation | A | A | B | B |

Footnote of Table 6
(*3): Product of Nisshinbo Chemical Inc.; 40 wt % aqueous solution
(*8): Product of Nippon Synthetic Chemical Industry Co., Ltd.; acrylic resin
(*7): Product of BYK Additives & Instruments; polyether-modified siloxane surfactant
The content, which is an active ingredient, of each of the components in the table is expressed in wt %.

As summarized in Table 6, Examples 7-1 and 7-2 showed good results in the ink film tensile strength evaluation and the yellowing evaluation. Example 7-1 in which the content of glycerin was 30.0 wt % and Example 7-2 in which the content of glycerin was 50.0 wt % showed good results also in the storage stability evaluation. Both Examples 7-1 and 7-2 showed "A" in the evaluation results in Table 6. Since Example 7-2 in which the content of glycerin was larger than that of Example 7-1 showed better result in the ink film tensile strength evaluation than Example 7-1, it can be considered that Examples 7-3 and 7-4 in each of which the content of glycerin is larger than that of Example 7-2 will show "A" in the results of the ink film tensile strength evaluation before washing and after drying although the evaluations were not made.

Examples 8-1 to 8-3 and Reference Examples 8-1 to 8-4

Components of the overcoat composition (Table 7) were stirred and mixed, thereby obtaining overcoats of Examples 8-1 to 8-3 and Reference Examples 8-1 to 8-4 shown in Table 7.

By using each of the overcoats of Examples 8-1 to 8-3 and Reference Examples 8-1 to 8-4, an image was formed on the T-shirt in the same manner as in Examples 3-1 to 3-9.

The overcoats of Examples 8-1 to 8-3 and Reference Examples 8-1 to 8-4 were subjected to an expiration date evaluation by the following method.

Expiration Date Evaluation Method

The expiration date evaluation was performed by subjecting the overcoat right after preparation (storage) and the overcoat that has stored in a thermostat bath at 60° C. for one week to the ink film tensile strength evaluation in the same manner as in Examples 3-1 to 3-9.

Table 7 shows the composition and evaluation results of the overcoats of Examples 8-1 to 8-3 and Reference Examples 8-1 to 8-4.

TABLE 7

| | | Examples | | | Reference Examples | | | |
|---|---|---|---|---|---|---|---|---|
| | | 8-1 | 8-2 | 8-3 | 8-1 | 8-2 | 8-3 | 8-4 |
| Carbodiimide group-containing compound (C) | CARBODILITE ®V-02 (*3) | 0.5 | 0.5 | 0.5 | — | — | — | — |
| Oxazoline group-containing compound (O) | EPOCROS ®WS-700 (*16) | — | — | — | 1.0 | 1.5 | 2.0 | 3.0 |
| Resin | Mowinyl ®-Powder730L (*8) | 1.0 | 2.0 | 3.0 | 2.0 | 3.0 | 2.0 | 3.0 |
| Surfactant | BYK ®-349 (*7) | 0.3 | 0.3 | 0.3 | 0.3 | 0.3 | 0.3 | 0.3 |
| Glycerin | | 50.0 | 50.0 | 50.0 | 50.0 | 50.0 | 50.0 | 50.0 |
| Water | | Balance | Balance | Balance | Balance | Balance | Balance | Balance |
| C/R | | 0.50 | 0.25 | 0.17 | — | — | — | — |
| O/R | | — | — | — | 0.50 | 0.50 | 1.0 | 1.0 |
| Expiration date | Before storage | A | A | A | A | A | B | B |
| | After storage | A | A | A | A | B | B | B |

Footnote of Table 7
(*3): Product of Nisshinbo Chemical Inc.; 40 wt % aqueous solution
(*16): Product of Nippon Shokubai Co., Ltd.; aqueous solution
(*8): Product of Nippon Synthetic Chemical Industry Co., Ltd.; acrylic resin
(*7): Product of BYK Additives & Instruments; polyether-modified siloxane surfactant
The content, which is an active ingredient, of each of the components in the table is expressed in wt %.

As summarized in Table 7, even though the content of the carbodiimide group-containing compound (C) of each of the overcoats of Examples 8-1 to 8-3 is lower than the content of the oxazoline group-containing compound (O) of each of the overcoats of Reference Examples 8-1 to 8-4, Examples 8-1 to 8-3 each showed a high ink film tensile strength even after storage, which suggests that each of the overcoats of Examples 8-1 to 8-3 has a long usable period.

It will be obvious to those having skill in the art that many changes may be made in the above-described details of the particular aspects described herein without departing from the spirit or scope of the invention as defined in the appended claims.

What is claimed is:

1. An overcoat to be applied to an ink printed on fabric or fabric to be printed with an ink, comprising: a carbodiimide group-containing compound, glycerin, at least one of an acrylic resin and a styrene-acrylic resin; and at least one surfactant selected from the group consisting of a polyether-modified siloxane surfactant, a polyether-modified polydimethylsiloxane surfactant, and a hydroxyl group-containing polyether-modified polydimethylsiloxane surfactant, and not comprising a coloring agent; wherein a ΔE*ab value between an area of the fabric to which the overcoat is not applied and an area of the fabric to which the overcoat is applied after washing is smaller than that before washing.

2. The overcoat according to claim 1, wherein a content of the carbodiimide group-containing compound in a total amount of the overcoat is 0.1 wt % to 5 wt %.

3. The overcoat according to claim 1, wherein the content of the carbodiimide group-containing compound in the total amount of the overcoat is 0.25 wt % or more.

4. The overcoat according to claim 1, wherein the carbodiimide group-containing compound is soluble in water.

5. The overcoat according to claim 4, wherein a content of the water-soluble carbodiimide group-containing compound in the total amount of the overcoat is 0.75 wt % or less.

6. The overcoat according to claim 5, wherein the content of the water-soluble carbodiimide group-containing compound in the total amount of the overcoat is more than 0.25 wt %.

7. The overcoat according to claim 1, further comprising: at least one of an acrylic resin and a styrene-acrylic resin.

8. The overcoat according to claim 7, further comprising: a polyether-modified siloxane surfactant.

9. The overcoat according to claim 8, wherein a content of the polyether-modified siloxane surfactant in the total amount of the overcoat is 0.1 wt % to 1 wt %.

10. The overcoat according to claim 1, further comprising: a resin other than the carbodiimide group-containing compound, wherein the content of the carbodiimide group-containing compound (C) and the content of the resin (R) in the total amount of the overcoat satisfy C/R≤0.375.

11. The overcoat according to claim 1, wherein a content of the glycerin in the total amount of the overcoat is 30 wt % to 50 wt %.

12. The overcoat according to claim 1, further comprising: water.

13. The overcoat according to claim 1, wherein a b* value of an overcoat-applied area on the ink printed on the fabric or the fabric to be printed with the ink is 4.22 or less.

14. The overcoat according to claim 1, wherein the surfactant includes at least one of a polyether-modified polydimethylsiloxane surfactant or a hydroxyl group-containing polyether-modified polydimethylsiloxane surfactant.

15. A method for forming an image on fabric, comprising the following steps: printing an image on fabric with an ink; applying an overcoat to the ink printed on the fabric or the fabric to be printed with the ink; and thermally fixing the ink on the fabric by using a heating unit configured to heat a printed area of the fabric, wherein the overcoat comprises a carbodiimide group-containing compound, glycerin, at least one of an acrylic resin and a styrene-acrylic resin; and at least one surfactant selected from the group consisting of a polyether-modified siloxane surfactant, a polyether-modified polydimethylsiloxane surfactant, and a hydroxyl group-containing polyether-modified polydimethylsiloxane surfactant, and not comprising a coloring agent; wherein a ΔE*ab value between an area of the fabric to which the overcoat is not applied and an area of the fabric to which the overcoat is applied after washing is smaller than that before washing.

* * * * *